T. Hawkins,
Shears,
Nº 2,500.    Patented Mar. 23, 1842.
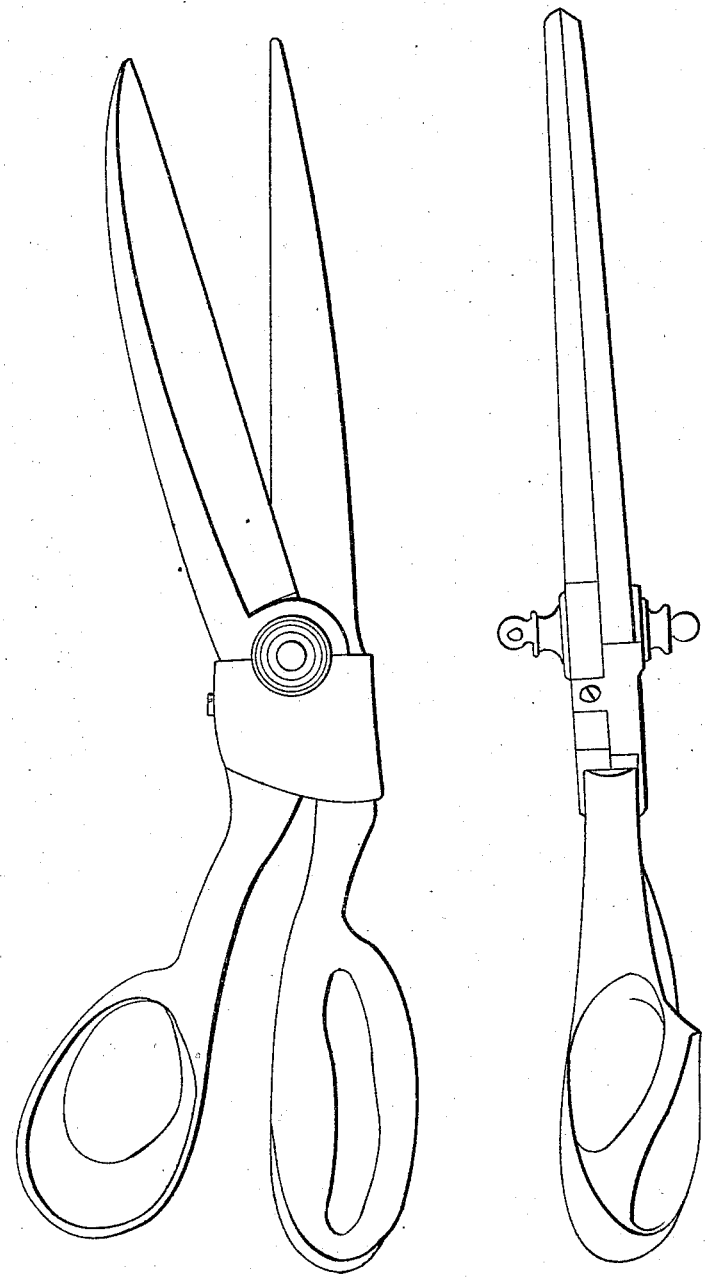

UNITED STATES PATENT OFFICE.

THOMAS HAWKINS, OF NEW YORK, N. Y., ASSIGNOR TO JAMES G. WILSON.

CONSTRUCTION OF TAILORS' SHEARS.

Specification of Letters Patent No. 2,500, dated March 23, 1842.

*To all whom it may concern:*

Be it known that I, THOMAS HAWKINS, of the city of New York, in the county and State of New York, have invented a new and Improved Mode of Constructing Tailors' Cutting and other Shears; and I do hereby declare the following is a full and exact description.

The nature of my invention consists in allowing the under blade and bow of the shears to remain stationary. And having a string joint connection between the upper blade and bow; so that by raising the upper bow, the upper blade is thereby raised, and in depressing the upper bow, the upper blade is thereby brought down by means of a proper purchase formed by the stirrup connecting the sling joint, and made to cut upon the stationary under blade.

To enable others skilled in the art to make and use my invention, I will proceed to describe its construction and operation.

I construct my under blade and bow in one piece; in any of the known forms of a bow and blade, as shown at 1 in the accompanying drawing. At the shoulder of the under blade I make a plate connecting the bow and blade together, as shown at A, A, in the accompanying drawing. In this plate near the shoulder of the blade I make a hole for a screw or rivet, in any of the known forms as shown at B. At a proper distance back of, and a little above the hole at B, according to the purchase required in the sling joint, I make another hole in, or through the plate for a screw or rivet, as shown at C. Upon the top and bottom of the plate, I let in a notch, as shown at D, D, to receive the tongues of the cap or shield.

I construct the upper blade and bow seperately, in two parts, in any of the known forms of blades and bows, as shown at 2 and 3. At the shoulder of the upper blade I make a shank with a point, of a proper length, according to the purchase required, as shown at 4, 4. In the shank, I make a hole, as shown at E, to correspond with the hole in the plate at B, for a screw or rivet, as shown at 5, to fasten the upper blade upon the plate.

At the connecting end of the bow, I make an inverted shank, with a point of a proper length according to the purchase required, as shown at F. In the shank of the bow, I make a hole, as shown at G, to correspond with the hole in the plate at C, for the screw or rivet to fasten the bow upon the plate. In the point of each shank, I make a groove or mortise, of a proper size, according to the power required, horizontally with the plate. Through the point of each shank, at right angles with the groove or mortise, I make a hole for a screw or rivet, as shown at H, H. In the grooves or mortises, I put a sling or stirrup, as shown at 6, made to fit with a free motion; and through each end of the sling or stirrup, I make a hole to correspond with the holes in the points of the shanks, and through each I put a screw or rivet, by which the points of the two shanks are connected together, and the sling joint is thus formed. The point of the shank of the bow is over, and by a circular shape, is made to act with a free motion in connection with the point of the shank of the upper blade.

Over the sling joint, I put a thin cap or shield of metal, of sufficient size to cover the same, as shown at K, with tongues, as shown at 7, 7, to fit the notches in the plate at D, D. In the cap or shield, I make a hole for the screw or rivet, which fastens the upper blade upon the plate, to pass through as shown at L. I confine the cap or shield solely by the shoulders or head of the screw or rivet, by which the upper blade is fastened upon the plate, or I put a small screw through each tongue or end of the cap or shield into the plate, as inclination may dictate.

What I claim as my invention, and desire to secure by Letters Patent, is—

The application to shears of the sling joint connection or any similar mode producing the same result, by which the upper blade is moved by the upper bow, and allows the under blade and bow to remain stationary as herein described, using therefor any material which will answer the purpose.

THOMAS HAWKINS.

Witnesses:
H. P. ALLEN,
A. L. ALLEN.